United States Patent [19]

Dischert et al.

[11] 4,322,747
[45] Mar. 30, 1982

[54] RAPID SYNCHRONIZATION OF INFORMATION ON SEPARATE RECORDED MEDIUMS

[75] Inventors: Robert A. Dischert, Burlington; James M. Walter, Columbus, both of N.J.

[73] Assignee: RCA Corporation, New York, N.Y.

[21] Appl. No.: 173,629

[22] Filed: Jul. 30, 1980

[51] Int. Cl.³ .................. H04N 5/76; G11B 27/10
[52] U.S. Cl. .................................. 358/127; 360/14; 360/73; 360/70
[58] Field of Search .................... 360/73, 70, 14; 358/127; 369/47

[56] References Cited

U.S. PATENT DOCUMENTS

| 3,230,307 | 1/1966 | Bounsall | 360/73 |
| 3,478,178 | 11/1969 | Grace | 360/70 |
| 3,638,089 | 1/1972 | Gabor | 360/73 |
| 3,643,012 | 2/1972 | Clark | 360/73 |
| 3,651,276 | 3/1972 | Clark | 360/70 |
| 3,787,615 | 1/1974 | Foerster | 360/70 |
| 3,887,941 | 6/1975 | Dann | 360/14 |
| 4,163,263 | 7/1979 | Rotter | 360/14 |
| 4,224,645 | 9/1980 | Mauch | 360/70 |

Primary Examiner—James W. Moffitt
Assistant Examiner—Alan Faber
Attorney, Agent, or Firm—Paul J. Rasmussen; William H. Meise; John M. O'Meara

[57] ABSTRACT

Separate durations of acceleration and constant velocity are utilized to attain phase locking between a recorded sync signal and an external reference sync signal while accelerating a recorded medium from an intermediate velocity to its operational velocity, with each duration being proportional to the intermediate velocity.

6 Claims, 5 Drawing Figures

RAPID SYNCHRONIZATION OF INFORMATION ON SEPARATE RECORDED MEDIUMS

BACKGROUND OF THE INVENTION

The present invention relates generally to the synchronization of information on separate recorded mediums and more particularly to what is known as framing in video recorders. When information is recorded on a medium, a sync signal is often disposed thereon at a frequency to identify discrete segments of the information. Then by synchronizing the sync signals on separate recorded mediums with an external or reference sync signal of the same frequency, the segments of information on the separate recorded mediums are correlated. One application of such information correlation is found in video recording where a discrete segment of information is a field or frame and where recorded information on separate mediums must be correlated or framed for different purposes, such as editing. Many of these purposes, especially editing, require that each separate recorded medium be stopped intermittently and then framed again or brought back up to its operational velocity with its recorded sync signal synchronized to the reference sync signal. Different prior art techniques exist for accomplishing this framing, but such techniques are slow because they are limited by the relatively low common frequency of the recorded and reference sync signals, which is usually the same as the frame sync signal, such as 30 Hz for NTSC systems. Therefore, numerous unsynchronized frames or fields are replayed while framing is accomplished with these prior art techniques.

SUMMARY OF THE INVENTION

A recorded medium is brought to its operational velocity while simultaneously phase locking a recorded sync signal thereon to an external or reference sync signal during a framing cycle of relatively short duration. The recorded medium is accelerated from an intermediate velocity to its operational velocity and its velocity is held constant before reaching the operational velocity to achieve the phase locking through slippage between the recorded and reference sync signals. The separate durations of acceleration and constant velocity are fixed in proportion to the intermediate velocity. In a particular embodiment of the invention, the acceleration is constant and occurs in distinct intervals between which the constant velocity interval occurs.

DESCRIPTION OF THE PREFERRED EMBODIMENTS

The fast framing cycle of this invention is accomplished with a control means for accelerating the recorded medium from an intermediate velocity to its operational velocity while maintaining the recorded medium at a constant velocity before reaching the operational velocity to establish a phase lock between a sync signal on the recorded medium and on external reference sync signal. With this control means, the acceleration and constant velocity durations are each fixed in proportion to the intermediate velocity and so long as the recorded sync signal is detectable, the intermediate velocity may be of any magnitude between zero and the operational velocity. Furthermore, the recorded medium may be brought up to the intermediate velocity from zero velocity during a preliminary cycle in the preferred embodiments of the invention.

Figure 1:
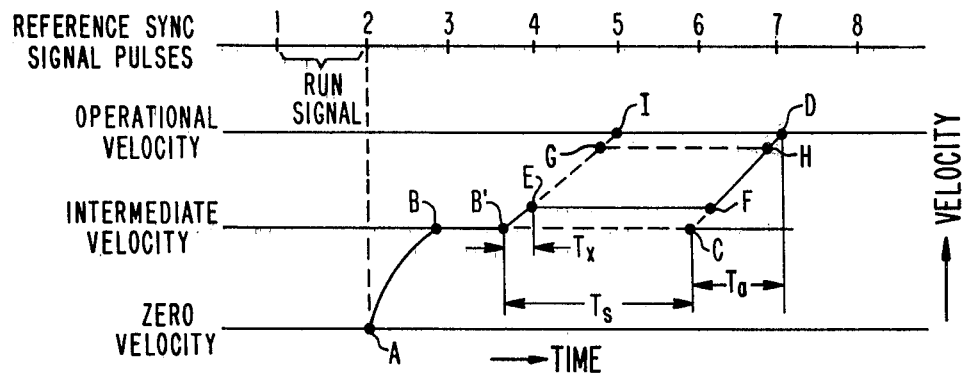
FIG. 1 illustrates the velocity profile utilized by the invention to bring a recorded medium to its operational velocity while simultaneously synchronizing a recorded sync signal thereon with a reference sync signal.

The many velocity profiles possible for the fast framing cycle of the invention are illustrated in FIG. 1 wherein the recorded medium is accelerated between zero velocity at point A and the intermediate velocity at point B to illustrate the preliminary cycle. Of course, the acceleration during the preliminary cycle must be initiated by a start command or run signal which can be applied at any time between successive pulses of the reference sync signal. Furthermore, this acceleration will require a finite time depending on the nature of the mechanism utilized to transport the recorded medium within the replay system, such as the capstan drive arrangement within a tape replay system. After the run signal is applied therefore, the transport arrangement is given sufficient time to stabilize the recorded medium at the intermediate velocity before starting the framing cycle. The recorded medium is accelerated to its operational velocity in a duration $T_a$ during the framing cycle however, it is maintained at a constant velocity for a duration $T_s$ before reaching the operational velocity. A slippage occurs between the recorded and reference sync signal during the constant velocity duration $T_s$ to establish the phase lock therebetween.

In most embodiments of the invention, the acceleration duration $T_a$ will be accomplished in distinct intervals between which the constant velocity duration $T_s$ occurs in a single interval. One such embodiment is illustrated by solid lines in FIG. 1, with the distinct intervals of the acceleration $T_a$ occuring from point B' to point E and from point F to point D, while the constant velocity interval $T_s$ occurs from point E to F. The first acceleration interval is commenced and lasts for a duration $T_x$ until the first recorded sync signal pulse occurs thereafter to start the constant velocity interval $T_s$. Immediately after the constant velocity interval is terminated, the second acceleration interval is commenced to complete the framing cycle. Because the difference between the operational velocity and the velocity maintained during the constant velocity interval determines the amount of slip derived between the recorded and reference sync signals, the duration of the first acceleration interval $T_x$ will determine the extent of that slip. If the phase difference between the recorded and reference pulses is great therefore, $T_x$ is short and a large slippage is accomplished; whereas if the phase difference between the recorded and reference pulses is small, $T_x$ is long and a small slippage is accomplished, such as when the constant velocity interval occurs between point G and point H.

Because the durations of $T_a$ and $T_s$ change with the magnitude of the intermediate velocity, the proportions of the velocity profile in FIG. 1 are dependent on what magnitude of intermediate velocity is selected. In a particular embodiment, the duration $T_a$ is fixed to reach the operational velocity in a time corresponding to the duration of a number of reference sync signal pulses equal to the inverse of the average velocity sustained while passing between the intermediate and operational velocities. The duration $T_s$ for this embodiment is fixed to correspond in time with the duration of a number of reference sync signal pulses equal to the inverse of one minus the ratio of the intermediate velocity over the operational velocity. This embodiment has been reduced to practice for intermediate velocity magnitudes equal to one-half and three-quarter times the operational velocity. The proportions of the FIG. 1 velocity profile are those which resulted when the intermediate velocity of one-half the operational velocity was utilized, and the implementing apparatus for that reduction to practice will be described hereinafter.

In these reductions to practice, the acceleration of the recorded medium from zero velocity to stabilization at one-half the operational velocity was started at the first occurring reference pulse after application of the run signal and was allowed one and two-thirds reference pulses for completion even though less time may actually be needed, especially if present day medium transport mechanisms were utilized. Because the average velocity between the intermediate velocity and the operational velocity was three-quarters the operational velocity, the duration of $T_a$ equaled four-thirds (4/3) reference pulses and the duration of $T_s$ equaled two reference pulses. When the intermediate velocity of three-quarters operational velocity was utilized, the duration of $T_a$ equaled eight-sevenths (8/7) reference pulses and the duration of $T_s$ equaled four reference pulses. Although the recorded medium must move at some minimum velocity to detect the pulses thereon, such detection is certainly possible in today's record and replay systems at one-third (⅓) the operational velocity and using this magnitude as the intermediate velocity, the durations of both $T_a$ and $T_s$ would be three halves (3/2) reference pulses.

Figure 2:
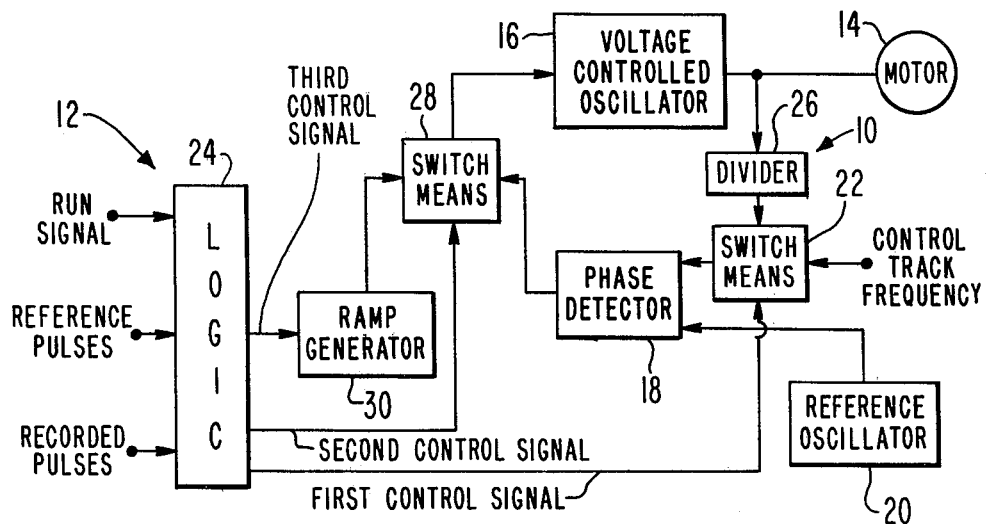
FIG. 2 is a block diagram of control apparatus for deriving the velocity profile of FIG. 1.

A replay system which utilizes the fast framing cycle of the invention includes control means such as the apparatus shown in FIG. 2 for deriving the velocity profile of FIG. 1. Generally speaking, this apparatus includes a preliminary cycle means 10 for controlling the recorded medium to accelerate it from rest to the intermediate velocity and a framing cycle means 12 for controlling the recorded medium to accelerate it from the intermediate velocity to the operational velocity in distinct intervals between which the constant velocity interval is maintained. However, the recorded medium can only be controlled through its transport arrangement which may be structured in any conventional manner within the scope of this invention.

A frequency controlled DC motor 14 is included in FIG. 2 because many conventional transport arrangements in present day record and replay systems are driven with that type of motor. The speed of motor 14 is directly proportional to the frequency of its input signal which is derived from a voltage controlled oscillator (VCO) 16 having an output frequency that is proportional to its input voltage level. The input voltage to the VCO 16 is derived from a phase detector 18 and is in proportion to the difference existing between the frequency of a control track signal on the recorded medium and a reference oscillator 20, with that VCO input voltage being sufficient to drive the recorded medium at its operational velocity when the frequencies of the control track signal and the oscillator 20 are the same. Within the preliminary cycle means 10, the control track frequency is applied to the phase detector 18 through a switch 22. A first signal from a logic circuit 24 controls the switch 22 when the recorded medium is to be accelerated between rest and the intermediate velocity, to change input of the phase detector 18 from the control track signal to the frequency output of the VCO 16 which is passed through a frequency divider 26. Within the framing cycle means 12, output from the phase detector 18 is applied to the VCO 16 through another switch 28 which is controlled by a second signal from the logic circuit 24 when the recorded medium is to be accelerated from the intermediate velocity to its operational velocity. The switch 28 functions to change the input at the VCO 16 from the output of the phase detector 18 to the output of a ramp generator 30 which is controlled by a third signal from the logic circuit 24. The recorded and reference sync signals, along with the start or run signal are applied to the logic circuit 24 which derives the first, second, and third signals therefrom to control the switches 22 and 28, and the ramp generator 30 respectively.

When the run signal is applied to the logic circuit 24, the first control signal enables the preliminary cycle means 10 through switch 22 and then the frequency divided output signal from the VCO 16 is applied to the phase detector 18. Since the operational velocity of the recorded medium is derived when the control track frequency thereon determines the speed of the motor 14 by comparison with the frequency of oscillator 20, the nature of the frequency divider 26 is determined by the relative magnitude of the intermediate velocity in comparison to the operational velocity. When the acceleration of the framing cycle is to be initiated, the logic circuit 24 applies the second and third control signals to the switch 28 and the ramp generator 30 respectively, while it interrupts the first control signal to reapply the control track frequency to the phase detector 18. Output from the ramp generator 30 is then applied to the VCO 16 through the switch 28 and that output accelerates the motor 14 until the first recorded pulse thereafter is received by the logic circuit 24. At that time, the third control signal from logic circuit 24 holds the output from the ramp generator 30 at a fixed level during the constant velocity interval of the recorded medium and then returns that output to the increasing level required to complete the acceleration of the recorded medium to its operational velocity. The second and third control signals from the logic circuit 24 then change to reapply the output of the phase detector 18 to the voltage controlled oscillator 16.

Figure 3:
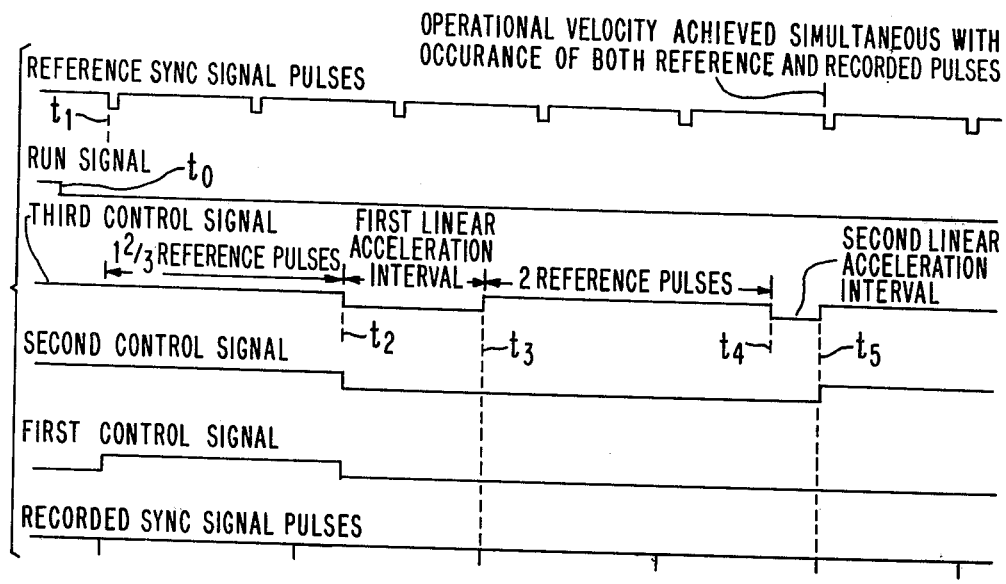
FIG. 3 is a pulse diagram relating to one embodiment of the control apparatus of FIG. 2.

FIG. 3 illustrates the signal inputs and outputs of the logic circuit 24 for the particular embodiment of the invention wherein the intermediate velocity is one-half the operational velocity. The run signal is applied to the logic circuit 24 at a time $t_o$ when the decision is made to bring the motionless recorded medium up to the operational velocity and the preliminary cycle means 10 is initiated at the time $t_1$ of the first reference pulse thereafter when the first control signal therefrom attains a high level to operate switch 22 and apply the frequency-divided output signal of VCO 16 to phase detector 18. After the time allotted for the recorded medium to reach the intermediate velocity has passed (one and two-thirds reference pulses in accordance with FIG. 1), the first control signal returns to a low level, while the second and third control signals both attain low levels at the time $t_2$ to enable the framing cycle means 12 which starts the acceleration of the recorded medium from its intermediate velocity to the operational velocity. When low, the second control signal operates switch 28 to change the input of VCO 16 from the output of phase detector 18 to the output of ramp generator 30. When low, the third control signal causes ramp generator 30 to develop an increasing output voltage. The first recorded sync signal pulse after time $t_2$ occurs at the time $t_3$ and returns the third control signal to a high level to fix the output of the ramp generator 30 at some level for the constant velocity interval (two reference pulses in accordance with FIG. 1). After the constant velocity interval, the acceleration is resumed at the time $t_4$ until the operational velocity is reached upon the simultaneous occurrence of a reference sync signal pulse and a recorded sync signal pulse. The second and third control signals then return to their high levels and switch 28 disconnects the output of ramp generator 30 from the VCO 16 and reconnects the output of phase detector 18 thereto. It should be noted that the first and second acceleration intervals of the framing cycle means 12 occur in the combined duration of one and one-third reference pulses in accordance with FIG. 1. Furthermore, only 6 reference sync signal pulses occur in FIG. 3 after the run signal is applied until the operational velocity of the recorded medium is achieved simultaneously with the occurrence of both the reference and recorded sync signal pulses.

Figure 4:
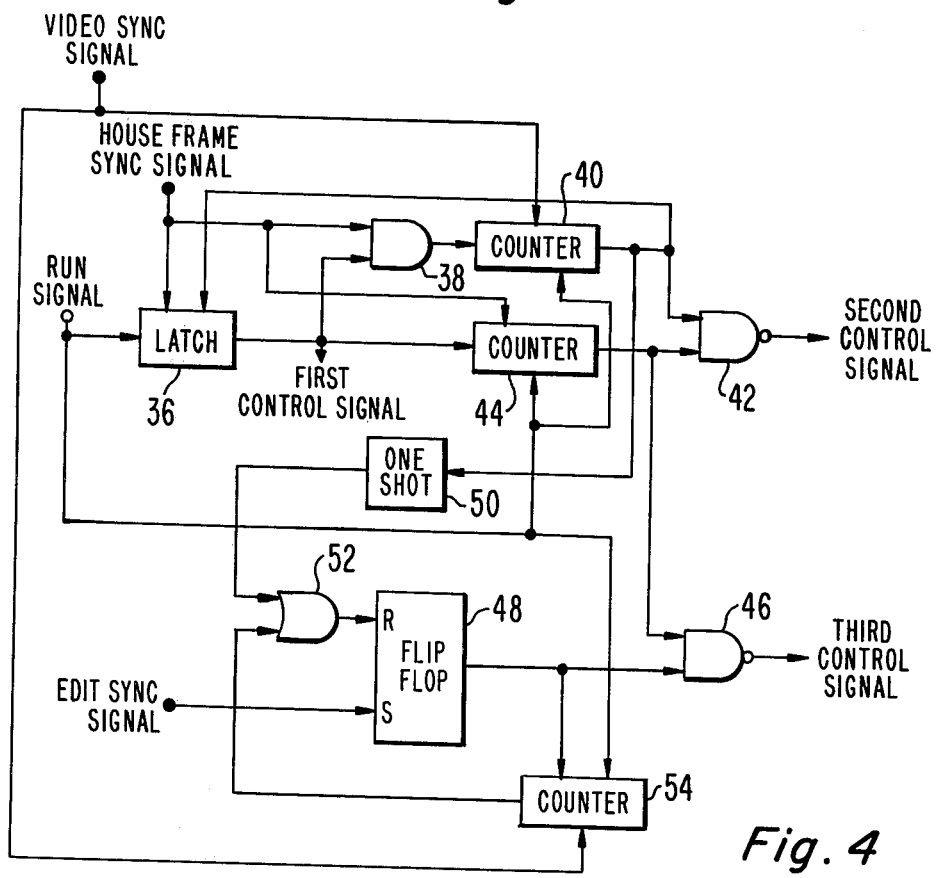
FIG. 4 is a particular embodiment of the logic circuit utilized in FIG. 2.

Many conventional circuits could be utilized to perform the function of each block in the fast framing apparatus of FIG. 2. However, in a video record and replay system for which the invention was reduced to practice using the velocity profile illustrated in FIG. 1, some special circuits were necessary. The logic circuit 24 of FIG. 2 is one such special circuit which was implemented as shown in FIG. 4. In this circuit the first, second, and third control signal outputs are derived from the inputs of the run signal, the reference pulses provided by a house frame sync signal, the recorded pulses provided by an edit sync signal on the recorded medium, and a recorded video sync signal of an appropriate frequency for use as a clock, such as the horizontal drive signal or the color subcarrier signal.

The first control signal for enabling the preliminary cycle means 10 of FIG. 2 is derived as the output of a latch 36 to which the run signal and the house frame sinc signal pulses are applied as inputs. Output from the latch 36 is also applied along with the house frame sync signal pulses to an AND gate 38 having its output applied to enable a counter 40 when those signals exist concurrently. The video sync signal frequency is applied to clock the counter 40 which counts out to change its output level after being enabled. The total count of counter 40 is equal in duration to the duration alotted for the acceleration of the recorded medium from rest to the intermediate velocity by the preliminary cycle means 10, or one and two thirds frame pulses in accordance with FIGS. 1 and 3. Output from the counter 40 is applied to reset the latch 36. Consequently, a high output level is developed by the latch 36 when the first reference pulse occurs after the run signal has been applied and this level persists until the latch 36 is reset thereafter when the counter 40 has counted out.

The second control signal is derived as the output of a NAND gate 42 having the output from counter 40 and the output from another counter 44 separately applied to the inputs thereof. The first control signal at the output of latch 36 enables the counter 44 simultaneously with the preliminary cycle means 10 and the counter 44 is clocked by the reference pulses. The total count of counter 44 is equal in duration to the duration alotted for the completion of both the preliminary and framing cycles or 5 reference pulses in accordance with FIGS. 1 and 3. Consequently, a low output level is developed by the NAND gate 42 when the first house frame pulse occurs after the run signal has been applied and this level persists until the operational velocity of the recorded medium is achieved simultaneously with the occurrence of both the reference and recorded pulses.

The third control signal is derived as the output of a NAND gate 46 having the outputs from a flip-flop 48 and the counter 44 separately applied to the inputs thereof. Output from the counter 40 is applied through a one-shot multivibrator 50 to one input of an OR gate 52 having its output applied to the reset input of the flip-flop 48. A counter 54 counts out to change its output level which is applied to the other input of OR gate 52. Output from flip-flop 48 is applied to enable the counter 54 and the video sync signal is applied to the clock input thereof. The recorded pulses are applied to the set input of flip-flop 48. Consequently, a low output level is developed by the NAND gate 46 when flip-flop 48 is reset at the completion of the count by counter 40 that lasts for the first acceleration interval of the framing cycle, which is terminated by the first recorded pulse thereafter when the flip-flop 48 is set to change its output level. Counter 54 is enabled by this change in output from flip-flop 48 and counts for a duration equal to the duration of two reference pulses, at the completion of which flip-flop 48 is again reset to produce a low output level from NAND gate 46 that lasts for the second acceleration interval of the framing cycle shown in FIG. 3, which is terminated when counter 44 completes its count.

Figure 5:
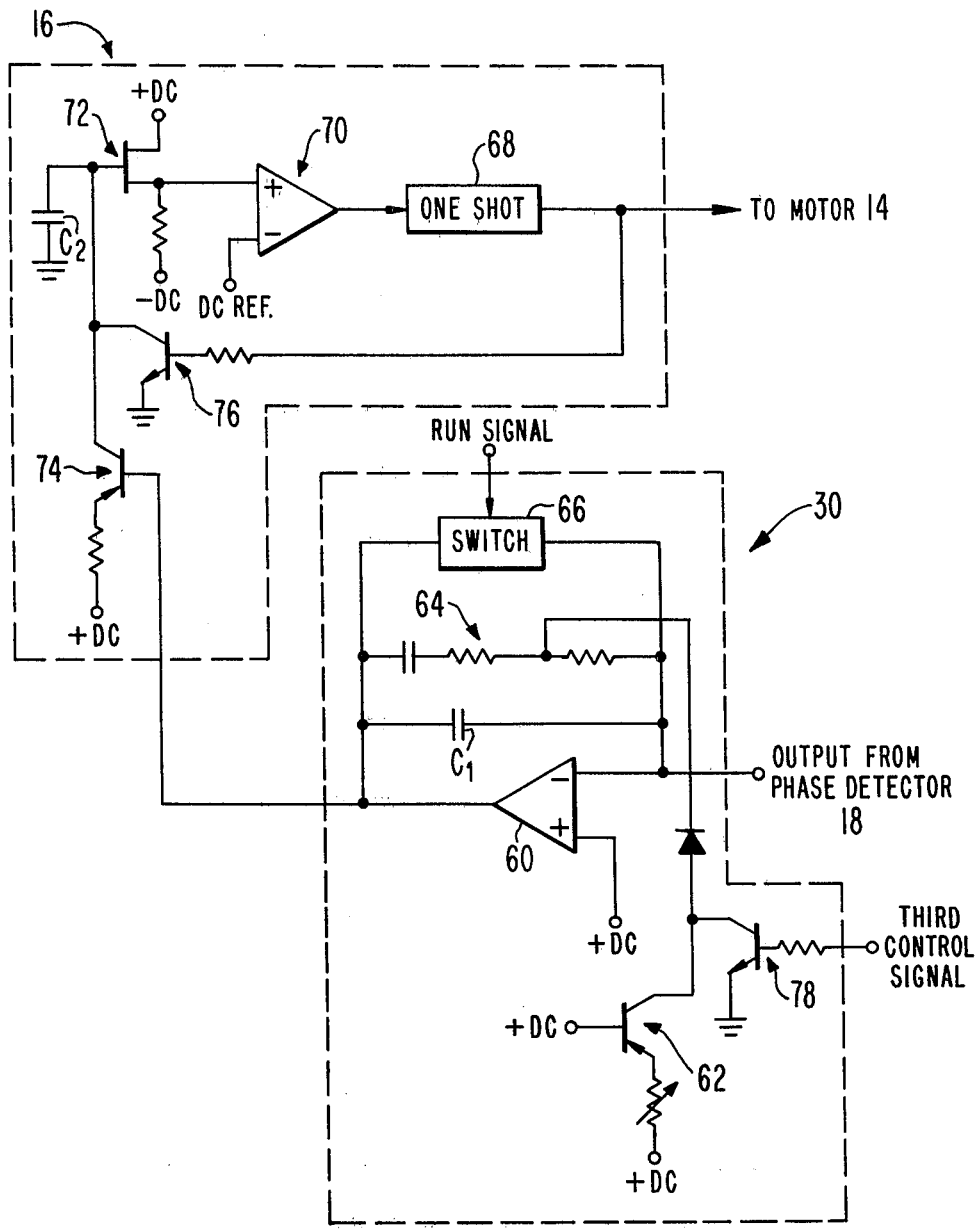
FIG. 5 is a particular embodiment of the voltage control oscillator and the ramp generator utilized in FIG. 2.

As shown in FIG. 5, particular circuitry was also utilized for the VCO 16 and the ramp generator 30 in reducing the fast framing apparatus of FIG. 2 to practice. For the ramp generator 30, an operational amplifier 60 is connected as an integrator with a capacitor $C_1$ disposed between its output and input. A bipolar transistor conventionally arranged as a constant current generator 62 applies current through a diode to this integrator at a location between resistors within a conventional gain and equalization network 64 thereof. A switch 66 is conventionally disposed to connect the output and negative input of the operational amplifier 60 and thereby reset the integrator when the run signal is applied.

For the VCO 16, a one-shot multivibrator 68 produces an output pulse for each high level input it receives from a comparator 70. A FET is conventionally arranged as a voltage follower 72 which applies its output to the positive input of an operational amplifier that is conventionally arranged as the comparator 70, with a reference voltage applied to its negative input. The charge level on a capacitor $C_2$ is applied to the input of the voltage follower 72 and a bipolar transistor is conventionally arranged as a voltage controlled adjustable current generator 74 which applys its output to charge the capacitor $C_2$. Output pulses from the one-shot 68 are directed to the motor 14 and also to a bipolar transistor which is conventionally arranged as a switch 76 to discharge the capacitor $C_2$ after each pulse is developed. The output voltage level of the integrator is applied directly to control the output level of the current generator 74 without passing through the switch 28 in accordance with FIG. 2. This is accomplished by applying the output from the phase detector 18 to the VCO 16 through the capacitor $C_1$ in FIG. 5, while disabling the phase detector 18 during the framing cycle with the second control signal.

The third control signal is applied to a bipolar transistor conventionally arranged in the integrator as a switch 78 which grounds the output of the current generator 62 except during the first and second acceleration intervals of the framing cycle.

What we claim is:

1. In a replay system of the type wherein a recorded medium having a sync signal disposed thereon to identify discrete segments of information must be brought up to its operational velocity at which the recorded sync signal must be phase locked with an external reference sync signal, the improvement comprising:

framing means for controlling the recorded medium to accelerate it from an intermediate velocity to the operational velocity while its velocity is held constant before reaching the operational velocity to cause slippage between the recorded and reference sync signals in providing for the phase lock therebetween, with the separate durations of the acceleration and constant velocity being derived in proportion to the intermediate velocity.

2. The replay system of claim 1 wherein said framing means accelerates the recorded medium from the intermediate velocity to the operational velocity in distinct intervals between which the constant velocity is maintained for a single interval.

3. The replay system of claim 1 wherein the recorded medium is accelerated from rest to the intermediate velocity during a preliminary cycle.

4. The replay system of claim 1 wherein the duration of the acceleration is fixed to reach the operational velocity in a time corresponding to the duration of a number of reference sync signal pulses equal to the inverse of the average velocity sustained while passing between the intermediate and operational velocities and the duration of the constant velocity is fixed to correspond in time with the duration of a number of reference sync signal pulses equal to the inverse of one minus the ratio of the intermediate velocity over the operational velocity.

5. The replay system of claim 1 and further including a transport system for the recorded medium; said transport system including a frequency controlled D.C. motor which is driven by a voltage controlled oscillator in a closed loop arrangement, said voltage controlled oscillator receiving its input through a switch which is controlled by a first signal from a logic circuit to interrupt said closed loop arrangement and apply the output of a ramp generator to said voltage controlled oscillator during the framing cycle, said ramp generator being controlled by a second signal from said logic circuit to determine the separate durations of the acceleration and constant velocity during the framing cycle.

6. The replay system of claim 1 wherein the intermediate velocity attained by the recorded medium is equal to one-half the operational velocity thereof.

* * * * *